US009141550B2

(12) United States Patent
Busaba et al.

(10) Patent No.: US 9,141,550 B2
(45) Date of Patent: Sep. 22, 2015

(54) SPECIFIC PREFETCH ALGORITHM FOR A CHIP HAVING A PARENT CORE AND A SCOUT CORE

(71) Applicant: International Business Machines Corporation, Armonk, NY (US)

(72) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Campbell Hall, NY (US); Chung-lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 13/785,369

(22) Filed: Mar. 5, 2013

(65) Prior Publication Data
US 2014/0258629 A1 Sep. 11, 2014

(51) Int. Cl.
*G06F 12/08* (2006.01)

(52) U.S. Cl.
CPC .......... *G06F 12/0862* (2013.01); *G06F 12/084* (2013.01); *G06F 2212/6028* (2013.01); *G06F 2212/622* (2013.01)

(58) Field of Classification Search
CPC ............. G06F 12/0862; G06F 2212/6028; G06F 2212/6026; G06F 9/30047; G06F 12/084; G06F 2212/622
USPC .................................. 711/130, 137
See application file for complete search history.

(56) References Cited

U.S. PATENT DOCUMENTS

| 6,470,427 B1 | 10/2002 | Arimilli et al. |
| 7,509,481 B2 | 3/2009 | Chaudhry et al. |
| 7,730,263 B2 | 6/2010 | Burtscher et al. |
| 7,950,012 B2 | 5/2011 | Tirumalai et al. |
| 7,962,314 B2 | 6/2011 | Chernoff |

(Continued)

FOREIGN PATENT DOCUMENTS

JP 2010217992 A 9/2010

OTHER PUBLICATIONS

UK Internation Search Report and Written Opinion for International Application No. PCT/IB2014/058939; International Filing Date: Feb. 2, 2014; Date of Mailing: May 13, 2014; 6 pages.

(Continued)

*Primary Examiner* — Jasmine Song
(74) *Attorney, Agent, or Firm* — Cantor Colburn LLP; Margaret McNamara (57) ABSTRACT

Embodiments relate to a method, system, and computer program product for prefetching data on a chip having at least one scout core and a parent core. The method includes saving a prefetch code start address by the parent core. The prefetch code start address indicates where a prefetch code is stored. The prefetch code is specifically configured for monitoring the parent core based on a specific application being executed by the parent core. The method includes sending a broadcast interrupt signal by the parent core to the at least one scout core. The broadcast interrupt signal being sent based on the prefetch code start address being saved. The method includes monitoring the parent core by the prefetch code executed by at least one scout core. The scout core executes the prefetch code based on receiving the broadcast interrupt signal.

6 Claims, 8 Drawing Sheets

(56) References Cited

U.S. PATENT DOCUMENTS

| | | | |
|---|---|---|---|
| 7,975,107 | B2 | 7/2011 | Beckmann et al. |
| 2004/0148491 | A1 | 7/2004 | Damron |
| 2006/0155963 | A1 | 7/2006 | Bohrer et al. |
| 2007/0156971 | A1 | 7/2007 | Sistla et al. |
| 2008/0059715 | A1 | 3/2008 | Tomita et al. |
| 2008/0141268 | A1 | 6/2008 | Tirumalai et al. |
| 2009/0199181 | A1 | 8/2009 | Arimilli et al. |
| 2010/0241811 | A1 | 9/2010 | Solihin |
| 2010/0281282 | A1 | 11/2010 | Sawyers |
| 2010/0293312 | A1 | 11/2010 | Sonnier et al. |
| 2010/0299496 | A1 | 11/2010 | Arimilli et al. |
| 2011/0055805 | A1 | 3/2011 | Herdeg et al. |
| 2011/0113199 | A1 | 5/2011 | Tang et al. |
| 2011/0125971 | A1 | 5/2011 | Kruglick |
| 2011/0167416 | A1 | 7/2011 | Sager et al. |
| 2011/0231612 | A1 | 9/2011 | Karlsson et al. |
| 2011/0296431 | A1* | 12/2011 | Gschwind et al. ............ 719/310 |

OTHER PUBLICATIONS

J. Lee, et al., "Prefetching with Helper Threads for Loosely Coupled Multiprocessor Systems." IEEE Transactions on Parallel and Distributed Systems: 2009, pp. 1-16; vol. 20.

Darouich et al., "Service de Configuration Predictif pour Plateforme Multicoeur Reconfigurable Heterogene," RenPar'18/SympA'2008/CFSE'6, version 1-4, Jan. 2008.

Chaudhry et al., "High-Performance Throughput Computing," IEEE Computer Society, May-Jun. 2005, pp. 32-45.

UK International Serach Report and Written Opinion for International Application No. PCT/IB2014/058955; International Filing Date: Feb. 13, 2014; Date of mailing: Jun. 16, 2014; 10 pages.

Ganusov et al. "Efficient Emulation of Hardward Prefetchers vis Event-Driven Helper Threading," Sep. 2006, pp. 144-153.

* cited by examiner

SPECIFIC PREFETCH ALGORITHM FOR A CHIP HAVING A PARENT CORE AND A SCOUT CORE

BACKGROUND

The present invention relates generally to multi-core chips having a parent core and a scout core, and more specifically, to specific prefetch algorithms for a parent core in a multi-core chip.

Multiple cores may be located on a single chip. In one approach, a second core on the same chip as the parent core may be provided as a scout core. In one approach to leverage or utilize the existing scout core, the scout core is used to prefetch data from a shared cache into the parent core's private cache. This approach may be especially useful in the event the parent core encounters a cache miss. A cache miss occurs when a particular line of data causes a search of a directory of the parent core, and the requested line of cache is not present. One typical approach to obtain the missing cache line is to initiate a fetch operation to a higher level of cache. The scout core provides a mechanism that is used to prefetch data needed by the parent core.

It should be noted that various application behave differently, and as a result one prefetching algorithm or approach may not always improve latency of accessing cache content. Specifically, for example, if the parent core is executing several different applications, then the prefetching algorithm used to monitor the different applications may provide various latencies for accessing cache content depending on the specific application that is being executed. For example, an application designed to search through a sparsely populated database may behave differently (e.g., the prefetching algorithm may provide a higher or lower latency of accessing cache content) when compared to an application designed to perform image color correction.

SUMMARY

Embodiments relate to a system for prefetching data on a chip having at least one scout core and a parent core. A prefetch code start address is saved by the parent core. The prefetch code start address indicates where a prefetch code is stored. The prefetch code is specifically configured for monitoring the parent core based on a specific application being executed by the parent core. A broadcast interrupt signal is sent by the parent core to the at least one scout core. The broadcast interrupt signal is sent based on the prefetch code start address being saved. The parent core is monitored by the prefetch code executed by at least one scout core. The scout core executes the prefetch code based on receiving the broadcast interrupt signal.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

An embodiment for prefetching data for a parent core by a scout core in a multi-core chip having improved prefetch efficiency is disclosed. In one exemplary embodiment, the multi-core chip includes the parent core and at least one scout core. The parent core saves a prefetch code start address. The prefetch code start address indicates where a specific prefetch code is stored. The prefetch code is specifically configured for monitoring the parent core based on a specific application being executed by the parent core. The scout core monitors the parent core by executing the specific prefetch code. The specific prefetch code may correspond to a specific application that the parent core selectively executes (e.g., if an application does not have a specific prefetching code associated therewith, then the scout core may execute a defacto or default prefetching code instead). It should be noted that various applications executed by the parent core behave differently, and thus a general prefetching algorithm (e.g., a prefetching algorithm not tailored for a specific application) may not always improve latency depending on the specific application the parent core is executing. The approach as disclosed in exemplary embodiments allows the scout core to monitor the parent core using the specific prefetch code that is specifically tailored to monitor a specific application the parent core executes. The parent core may send a broadcast interrupt signal to the scout core to switch prefetch code based on the specific application the parent core is executing.

Figure 1:
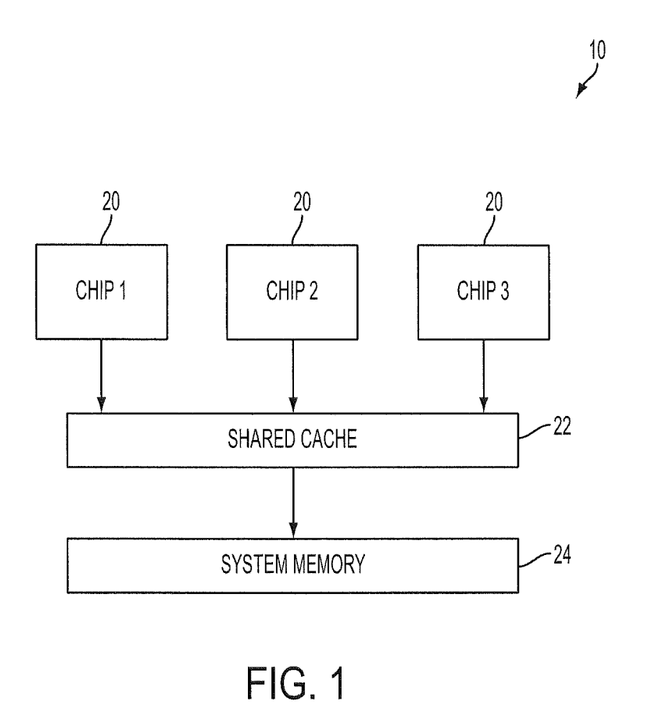
FIG. 1 depicts multi-core chips in accordance with an embodiment.

FIG. 1 illustrates an example of a computing system 10 in accordance with one embodiment. The computing system 10 includes at least one central processing (CP) chip 20. In the exemplary embodiment as shown in FIG. 1, three CP chips 20 are shown, however it is to be understood that any number of CP chips 20 may be used as well. For example, in one approach, the computing system 10 may include eight CP chips 20. In another approach, the computing system 10 may include up to twelve or sixteen CP chips 20. Each CP chip 20 is in communication with a shared cache 22 and a system memory 24.

Figure 2A:
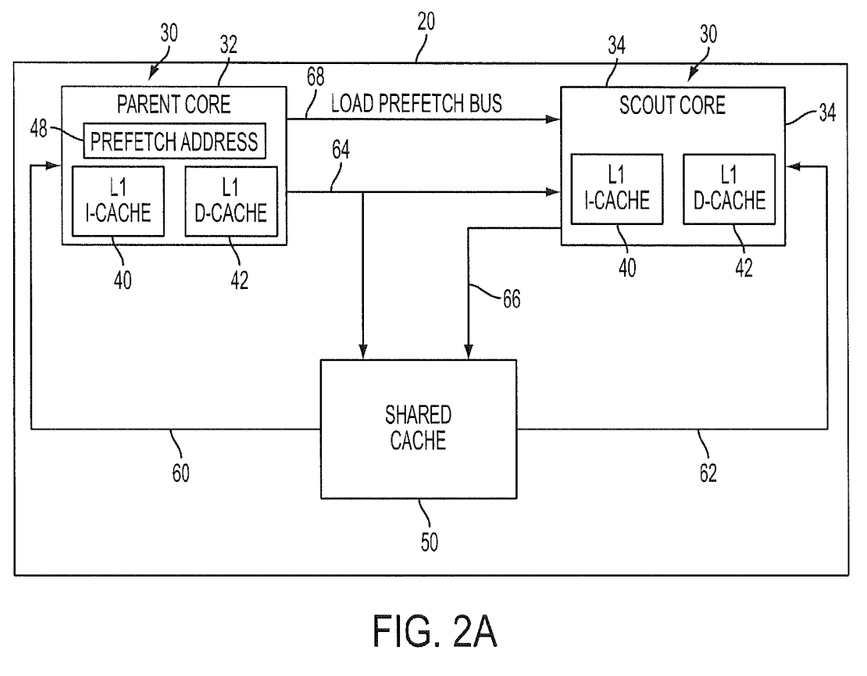
FIG. 2A depicts a central processing (CP) chip in accordance with an embodiment.
Figure 2B:
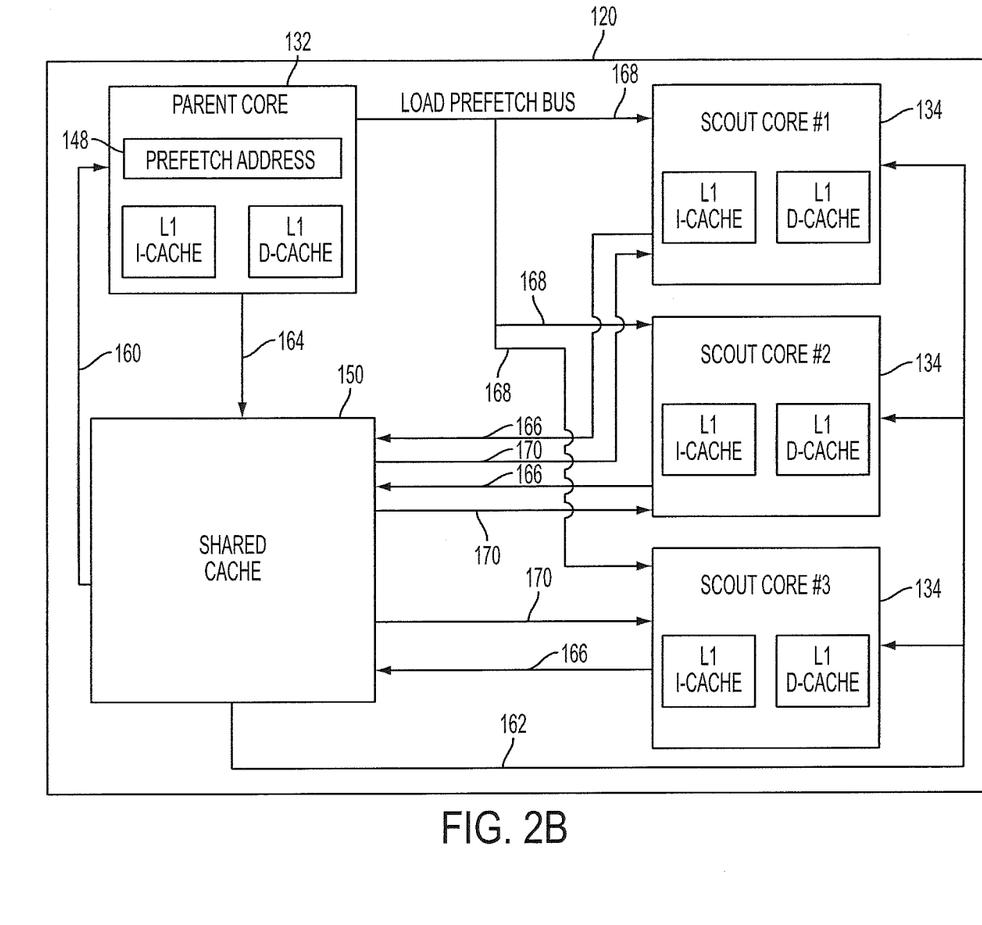
FIG. 2B depicts a CP chip in accordance with an alternative embodiment.

Referring now to FIGS. 1-2A, each CP chip 20 includes multiple cores 30 for the reading and executing of instructions. For example, in the exemplary embodiment as shown in FIG. 2A, each CP chip 20 includes a parent core 32 and a scout core 34, however it is understood that multiple parent cores 32 and scout cores 34 may be located on the CP chip 20. For example, in one approach the CP chip 20 may include four parent cores 32 that are each in communication with a scout core 34 (i.e., a total of eight cores). In the alternative embodiment as shown in FIG. 2B illustrating a CP chip 120, a parent core 132 may be in communication with multiple scout cores 134. For example, in one approach the CP chip 120 may be provided with two parent cores 132 that are each in communication with three scout core 134 (i.e., a total of eight core).

Referring back to FIG. 2A, each core 30 also includes a respective instruction I-cache 40 and a data D-cache 42. In the exemplary embodiment as shown in FIG. 2A, the cores 30 each include only a level one (L1) cache, however it is to be understood that in various embodiments the cores 30 may also include a level two (L2) cache as well. Each core 30 is operatively coupled to a shared cache 50. In the embodiment as shown in FIG. 2A, the shared cache 50 is an L2 cache, however it is to be understood that the shared cache 50 may also be a level three (L3) cache as well.

A data return bus 60 is provided between the parent core 32 and the shared cache 50, and a data return bus 62 is provided between the scout core 34 and the shared cache 50. A fetch request bus 64 connects the parent core 32 with the shared cache 50 and the scout core 34, where data is sent from the parent core 32 to the shared cache 50 and the scout core 34. A fetch request bus 66 connects the scout core 34 with the shared cache 50, where the scout core 34 monitors the shared cache 50 through the fetch request bus 66. The fetch request bus 66 may also be used for fetching for the scout core 34. This is similar in behavior to fetch request bus 64 fetching for the parent core 32. Such fetching may be required for loading of one or more prefetching algorithms into the scout core 34 along with potentially needing to load in further data for analysis should the data that is being analyzed does not fit entirely into the local D-cache 40. A load prefetch bus 68 is located between the parent core 32 and the scout sore 34. The parent core 32 informs the scout core 32 to load prefetching code and a specific prefetch code start address indicating where prefetching code is stored through the load prefetch bus 68. The prefetching code may be stored in a variety of different locations in the computing system 10 that are memory address accessible such as, for example, the L1 I-cache 40 of the scout core, the shared cache 50, the shared cache 22 (FIG. 1), or the system memory 24 (FIG. 1).

Turning now to FIG. 2B, a data return bus 160 is provided between the parent core 132 and a shared cache 150, and a data return bus 162 is provided between the scout cores 134 and the shared cache 150. A fetch request bus 164 connects the parent core 132 with the shared cache 150, where data is sent from the parent core 132 to the shared cache 150. A fetch request bus 166 is provided for each scout core 134, and connects the scout core 134 with the shared cache 150. Data transmitted through the fetch request buses 166 is different between each of the scout cores 134. A load prefetch bus 168 is connected to each scout core 134, and is located between the parent core 132 and each scout core 134. A fetch monitoring bus 170 is provided for each scout core 134, and is located between the shared cache 150 and one of the scout core 134. Unlike the fetch request bus 166, data transmitted through the fetch monitoring buses 170 may or may not be different between each of the scout cores 134.

Turning back to FIG. 2A, the shared cache 50 acts as a hub or a connection such that the scout core 34 may monitor the parent core 32. The scout core 34 monitors the parent core 32 for at least one specified data pattern occurring in the parent core 32. Specifically, the scout core 34 executes prefetching code used to monitor the parent core 32. The prefetch code determines if one or more specified data patterns has occurred in the parent core 32, and sends a fetch request to the shared cache 50 based on the specified data pattern. The scout core 34 generally stores the prefetch code on the I-cache 40 located on the scout core 34.

The specified data pattern may be either a content request that leaves the parent core 32 (e.g., a request for a specific line of cache that is not present in the I-cache 40 or a D-cache 42 of the parent core 32), or a checkpoint address of the parent core 32. For example, if the specific data pattern is a cache miss (e.g., a missing line of cache in the I-cache 40 or the D-cache 42 of the parent core 32), then a prefetch for a projected missing cache line may be sent to the shared cache 50 by the scout core 34 though the fetch request bus 66. If the specified data pattern is the checkpoint address of the parent core 32, the scout core 34 monitors the parent core 32, and upon completion of a specified event (e.g., garbage collection or a context switch) the scout core 34 sends a prefetch request to the shared cache to acquire a cache line associated with the specified event.

The scout core 34 is configured to selectively execute specific prefetch code based on the specific application that the parent core 32 is executing. For example, if the parent core 32 executes application 'A', application 'B', and application 'C' sequentially one after another (e.g., the parent core 32 first executes application 'A', then application B', and then application 'C'), then the scout core 34 may execute prefetch code 'A' to monitor application 'A', prefetch code 'B' to monitor application 'B', and prefetch code 'C' to monitor application 'C'. That is, the specific prefetch code is specifically configured to monitor the parent core 32 while the parent core 32 executes a corresponding application (e.g., prefetch code 'A' monitors application 'A'). This is because specific prefetching codes may behave differently depending on the specific application that is executed by the parent core 32. For example, an application designed to search through a sparsely populated database may behave differently (e.g., the prefetching algorithm may provide a higher or lower latency of accessing cache content) when compared to an application designed to perform image color correction. It should be noted that if an application does not have a specific prefetching code associated therewith, then the scout core 34 may execute a defacto or default prefetching code instead. An architected state located internally within the scout core 34 provides the location of where the default prefetching code is stored to the scout core 34.

The parent core 32 generally executes various applications sequentially (i.e., one application at a time) while switching from one application to another at a relatively high rate (e.g., up to a rate of one hundred thousand times per second), which is referred to as multi-tasking. Specifically, the parent core 32 may execute any number of applications. When a specific application gives up control of the parent core 32 to another application, this is referred to as a task swap. During a task swap encountered by an operating system of the parent core 32, the parent core 32 saves off a prefetch address 48 (illustrated in FIG. 2B as 148) located within the parent core 32 associated with the current application that was executing. The prefetch address 48 indicates where the prefetch code starting address associated with the current application that was executing has been saved. The parent core 32 may then load a new application and update the prefetch address 48 with a prefetch code start address associated with the new application. The parent core 32 may then send a broadcast interrupt signal through the load prefetch bus 68 to the scout core 34. The broadcast interrupt signal provides the location of the prefetch code starting address and an interrupt notification. In the event there is no specific prefetching code associated with the new application that the parent core 32 has loaded, then the parent core 32 sends the broadcast interrupt signal to the scout core 34 indicating that the default prefetching code is to be loaded by the scout core 34.

Figure 3:
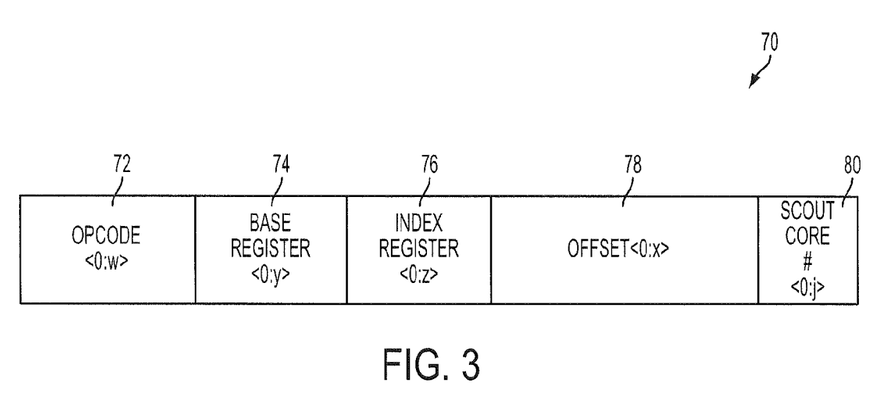
FIG. 3 depicts an architected scout preload instruction.

In addition to the task swap by the parent core 32, the broadcast interrupt signal may also be initiated by the specific application executing in the parent core 32. That is, the specific application executing in the parent core 32 may issue an instruction indicating that the scout core 34 is to load a specific prefetching code. Turning now to FIG. 3, an architected scout preload instruction 70 may be issued by the specific application executing in the parent core 32. The architected scout preload instruction 70 indicates the prefetch code starting address associated with the specific application executing in the parent core 32. For example, if the parent core 32 is executing application 'A', the architected scout preload instruction 70 issued by application 'A' indicates where the specific prefetching code corresponding to application 'A' has been saved.

The architected scout preload instruction 70 includes an opcode 72 for specifying the operation to be performed as well as a base register 74, an index register 76, and an offset 78 that specify a location of a start address where the specific prefetching code has been saved. The architected scout preload instruction 70 also indicates the specific scout core number 80 to be preloaded with the prefetch code (for example, referring to FIG. 2B, the specific scout core number 80 could indicate either scout core 1, scout core 2, or scout core 3). Each field (e.g., opcode 70, base register 74, index register 76, offset 78 and scout core number 80) of the architected scout preload instruction 70 may be a multi-bit field. The number of bits for each field may be different. Referring to both FIGS. 2A and 3, the parent core 32 executes the architected scout preload instruction 70. The parent core 32 then saves off the prefetch address 48 with the prefetch code starting address indicated by the architected scout preload instruction 70.

Referring back to FIG. 2A, upon receipt of the broadcast interrupt signal, an instruction pipeline of the scout core 34 is flushed. The scout core 34 may then execute the prefetch code indicated by the prefetch code start address sent from the parent core 32 through the load prefetch bus 68 to restart an instruction stream.

Figure 4:
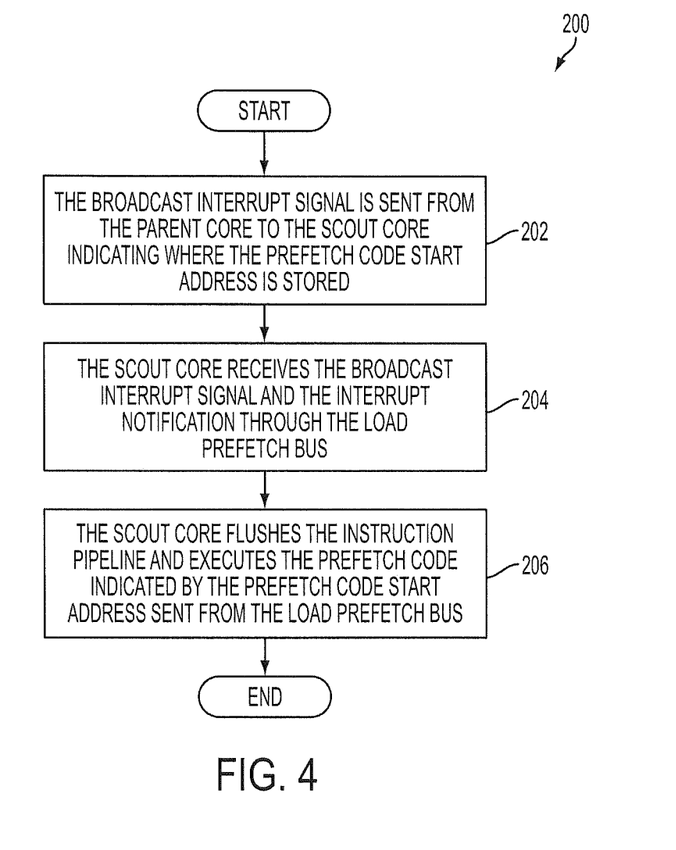
FIG. 4 depicts a process flow for illustrating an exemplary method for loading prefetch code from a parent core to a scout core.

Turning now to FIG. 4, a process flow diagram illustrating an exemplary method 200 for loading prefetch code from the parent core 32 to the scout core 34. Referring generally to FIGS. 2A-4, method 200 begins at block 202, where the broadcast interrupt signal is sent from the parent core 32 to the scout core 34 though the load prefetch bus 68 (or the load prefetch bus 168 in the event multiple scout cores 134 are connected to the parent core 132). The broadcast interrupt signal provides the location of the prefetch code starting address and the interrupt notification. Method 200 may then proceed to block 204.

In block 204, the scout core 32 receives the broadcast interrupt signal through the load prefetch bus 68 indicating the interrupt notification. Method 200 may then proceed to block 206.

In block 206, the instruction pipeline of the scout core 34 is flushed, and the scout core 34 executes the prefetch code indicated by the prefetch code start address sent from the parent core 32 through the load prefetch bus 68. Method 200 may then terminate.

Figure 5:
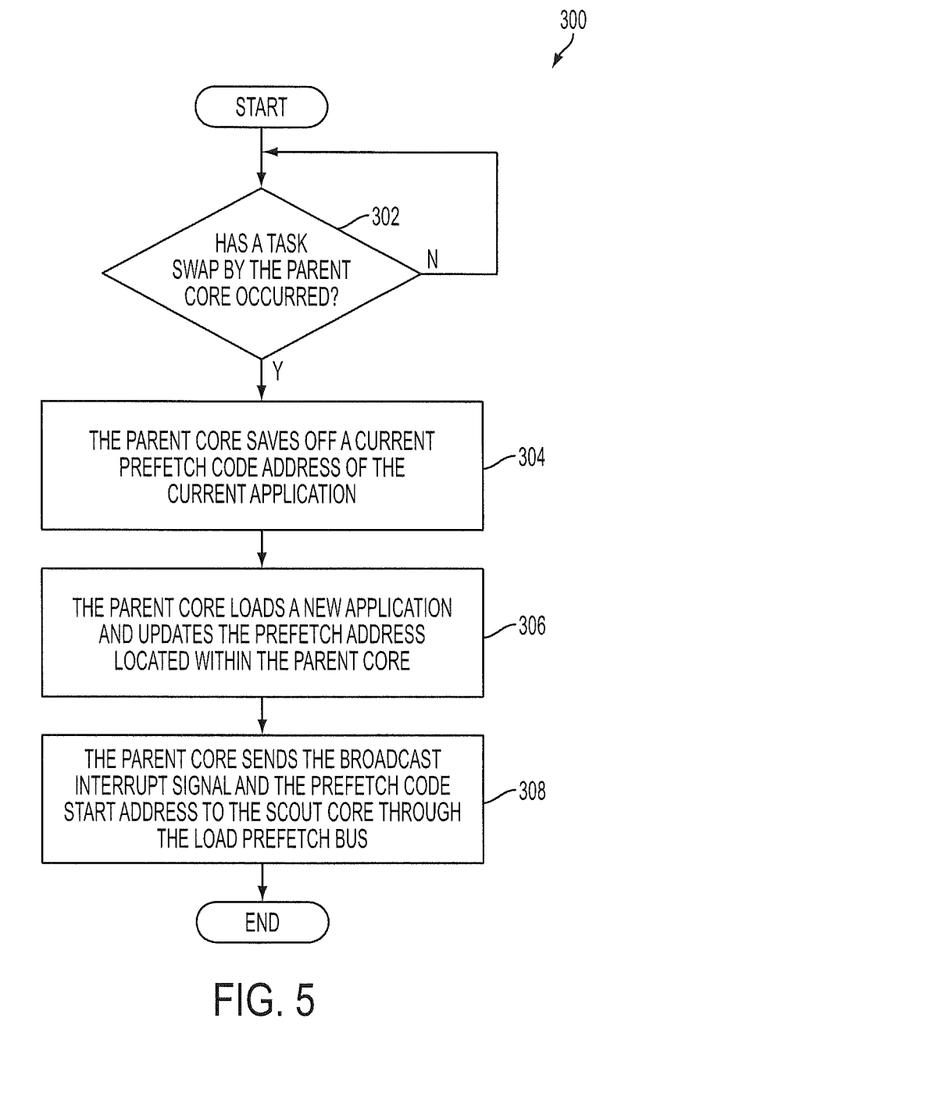
FIG. 5 depicts a process flow for illustrating an exemplary method for loading prefetch code during a task swap encountered by an operating system of the parent core.

FIG. 5 is an exemplary method 300 illustrating initiating the broadcast interrupt signal by a task swap encountered by an operating system of the parent core 32. Referring generally to FIGS. 2A-2B and 5, method 300 begins at block 302, where it is determined if the parent core 32 has encountered a task swap. In the event a task swap is encountered by the parent core 32, method 300 may then proceed to block 304.

In block 304, the parent core 32 saves off the prefetch address 48 associated with the current application executing. Method 300 may then proceed to block 306.

In block 306, the parent core 32 loads a new application and updates the prefetch address 48 with a prefetch code start address associated with the new application. Method 300 may then proceed to block 308.

In block 308, the parent core 32 sends the broadcast interrupt signal to the scout core 34 through the load prefetch bus 68. The broadcast interrupt signal provides the location of the prefetch code starting address and the interrupt notification. Method 300 may then terminate.

Figure 6:
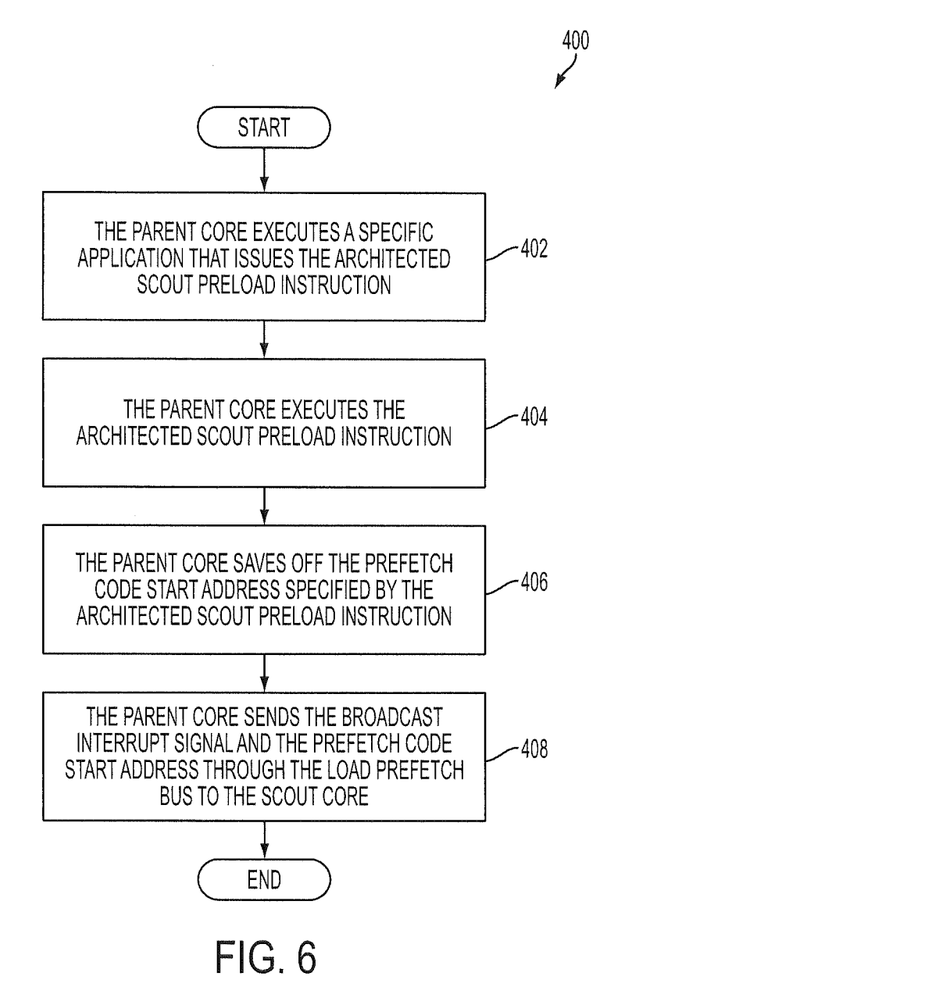
FIG. 6 depicts a process flow for illustrating an exemplary method for loading prefetch code by a specific application executing in the parent core.

FIG. 6 is an exemplary method 400 illustrating initiating the broadcast interrupt signal by the specific application executing in the parent core 32. Referring generally to FIGS. 2A-2B, 3 and 6, method 400 begins at block 402, where the parent core 32 executes a specific application that issues the architected scout preload instruction 70 (FIG. 3). Method 400 may then proceed to block 404.

In block 404, the parent core 32 executes the architected scout preload instruction 70. Method 400 may then proceed to block 406.

In block 406, the parent core 32 then saves off the prefetch address 48 with the prefetch code starting address specified by the architected scout preload instruction 70. Method 400 may then proceed to block 408.

In block 408, the parent core 32 sends the broadcast interrupt signal and the prefetch code start address through the load prefetch bus 68, and to the scout core 34. Method 400 may then terminate.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
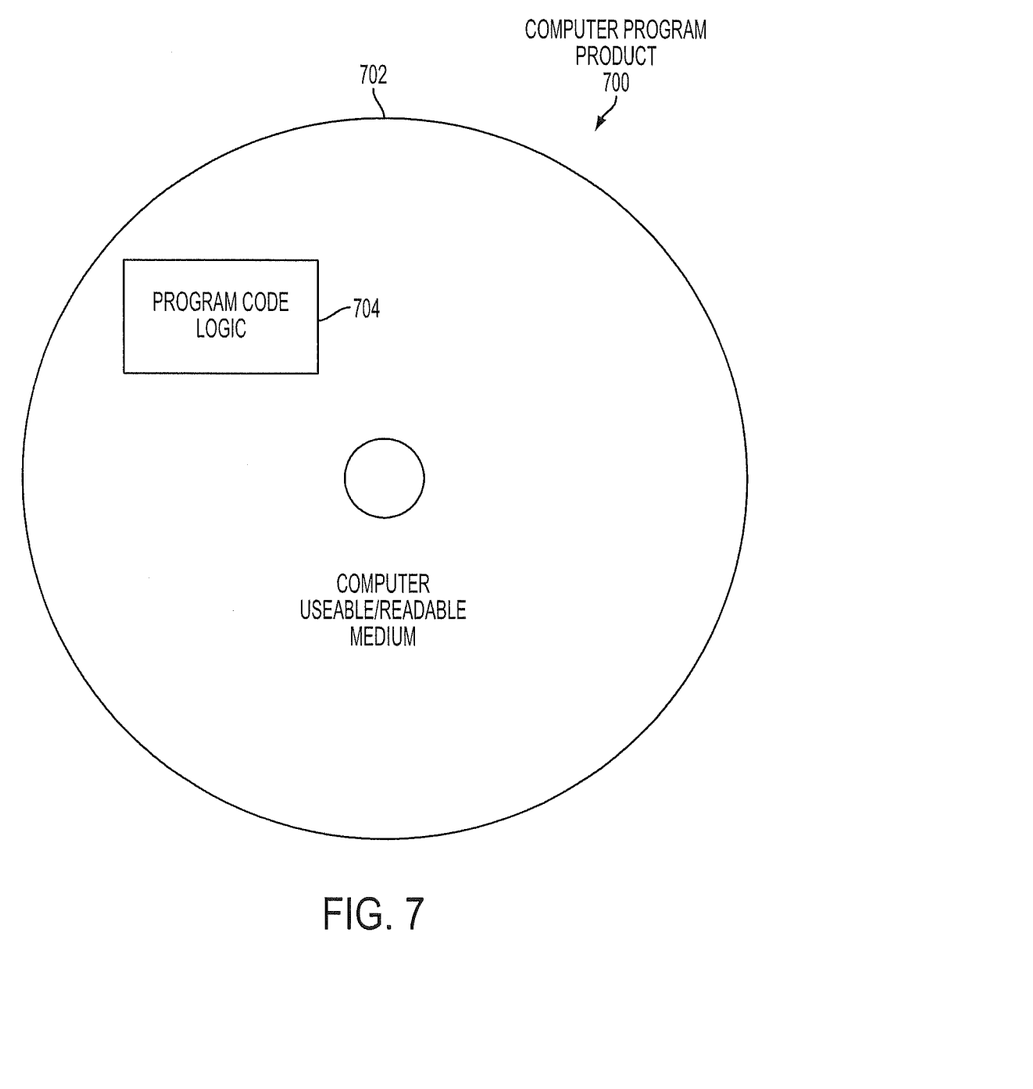
FIG. 7 illustrates a computer program product in accordance with an embodiment.

Referring now to FIG. 7, in one example, a computer program product 700 includes, for instance, one or more storage media 702, wherein the media may be tangible and/or non-transitory, to store computer readable program code means or logic 704 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments relate to a method, system, and computer program product for prefetching data on a chip having at least one scout core and a parent core. The method includes saving a prefetch code start address by the parent core. The prefetch code start address indicates where a prefetch code is stored. The prefetch code is specifically configured for monitoring the parent core based on a specific application being executed by the parent core. The method includes sending a broadcast interrupt signal by the parent core to the at least one scout core. The broadcast interrupt signal being sent based on the prefetch code start address being saved. The method includes monitoring the parent core by the prefetch code executed by at least one scout core. The scout core executes the prefetch code based on receiving the broadcast interrupt signal.

In an embodiment, the method further includes the parent core saving the prefetch code start address based on a task swap occurring within the parent core.

In an embodiment, the method further includes the parent core saving the prefetch code start address based on the specific application issuing an instruction.

In an embodiment, the method further includes the broadcast interrupt signal indicating that a default prefetching code is to be loaded by the at least one scout core. An architected state is located internally within the scout core provides a location of the default prefetching code.

In an embodiment, the method further includes the broadcast interrupt signal providing a location of the prefetch code start address and an interrupt signal.

In an embodiment, the method further includes a load prefetch bus is located between the parent core and the at least one scout core. The broadcast interrupt signal is sent through the load prefetch bus.

In an embodiment, the method further includes a shared cache connecting the parent core to the at least one scout core. A fetch request bus is provided to connect the parent core to both the shared cache and the at least one scout core.

Technical effects and benefits include allowing the scout core 34 to monitor the parent core 32 using a prefetch code that is specifically tailored to monitor a specific application the parent core 32 executes. The parent core 32 may send the broadcast interrupt signal to the scout core 34 through the load prefetch bus 68 to switch the specific prefetch code based on the application the parent core 32 is executing. Thus, the approach as discussed above increases prefetch efficiency of the computing system 10.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for prefetching data on a chip, the system comprising:
    a parent core located on the chip, the parent core configured to selectively execute a plurality of applications, one of the plurality of applications being a specific application; and
    at least one scout core located on the chip, the system configured to perform a method comprising:
        saving a prefetch code start address by the parent core, the prefetch code start address indicating where a prefetch code is stored, and the prefetch code specifically configured for monitoring the parent core based on the specific application being executed, wherein the parent core saves the prefetch code start address based on a task swap occurring within the parent core;
        sending a broadcast interrupt signal by the parent core to the at least one scout core, the broadcast interrupt signal being sent based on the prefetch code start address being saved; and
        monitoring the parent core by the at least one scout core, the at least one scout core executing the prefetch code to monitor the parent core, the executing of the prefetch code based on receiving the broadcast interrupt signal.

2. The computer system as claimed in claim 1, wherein the parent core saves the prefetch code start address based on the specific application issuing an instruction.

3. The computer system as claimed in claim 1, wherein the broadcast interrupt signal indicates that a default prefetching code is to be loaded by the at least one scout core, wherein an architected state located internally within the at least one scout core provides a location of the default prefetching code.

4. The computer system as claimed in claim 1, wherein the broadcast interrupt signal provides a location of the prefetch code start address and an interrupt signal.

5. The computer system as claimed in claim 1, wherein a load prefetch bus is located between the parent core and the at least one scout core, and wherein the broadcast interrupt signal is sent through the load prefetch bus.

6. The computer system as claimed in claim 1, further comprising a shared cache that connects the parent core to the at least one scout core, wherein a fetch request bus is provided to connect the parent core to both the shared cache and the at least one scout core.

* * * * *